Jan. 14, 1941. E. H. TJOMSLAND 2,228,934
MASSAGING APPLIANCE
Filed April 18, 1939 2 Sheets-Sheet 2
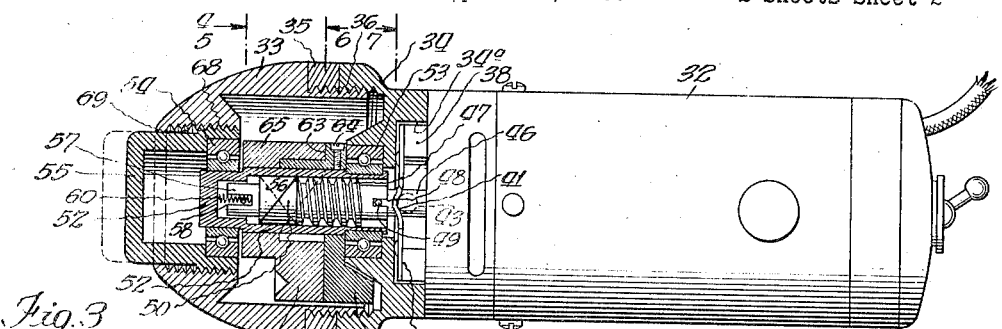
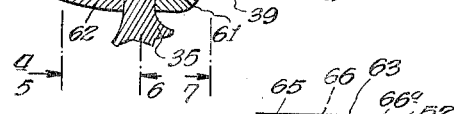
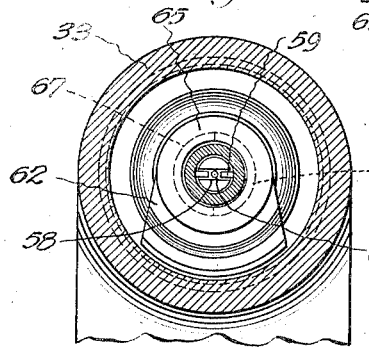
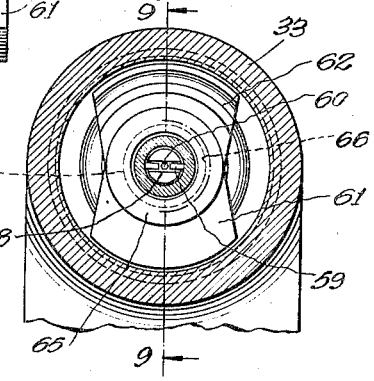
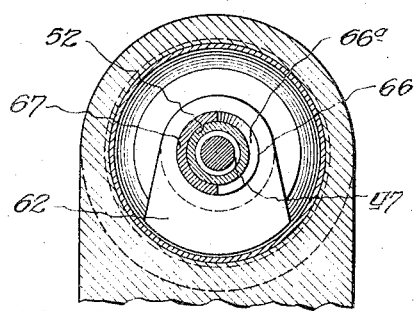
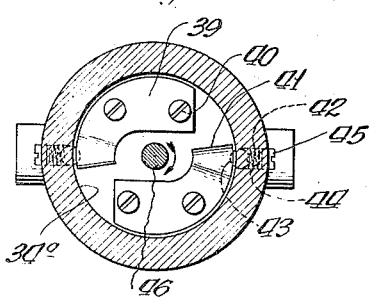
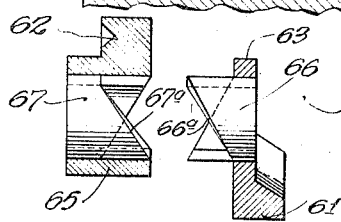
Inventor:
Eli H. Tjomsland
By: Milo B. Stevens & Co.
Atty's.

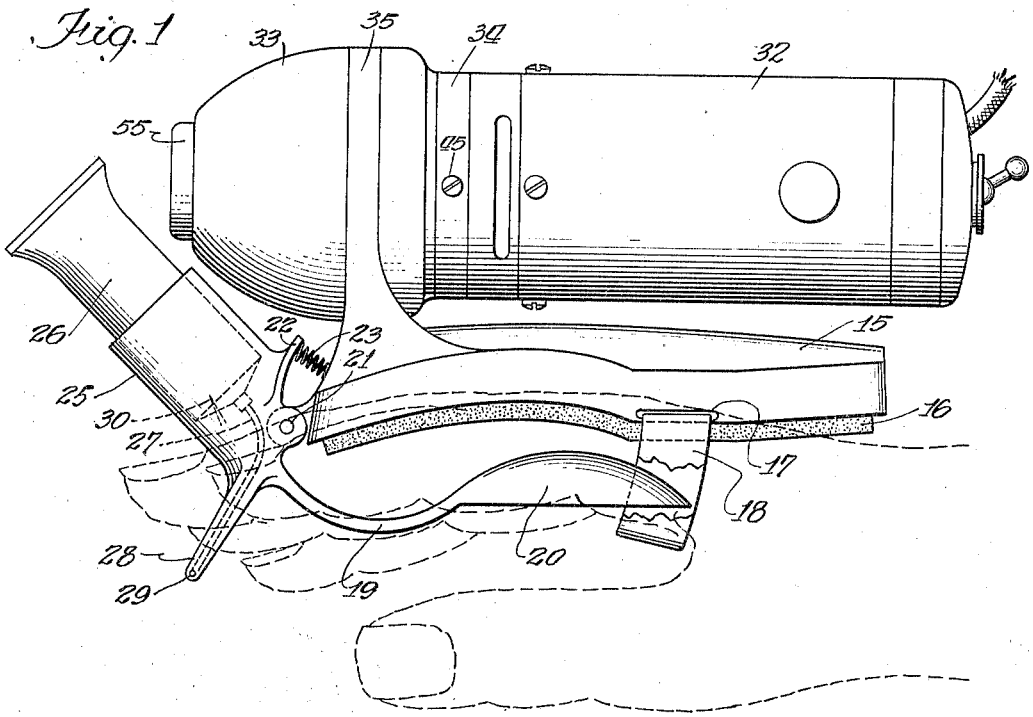
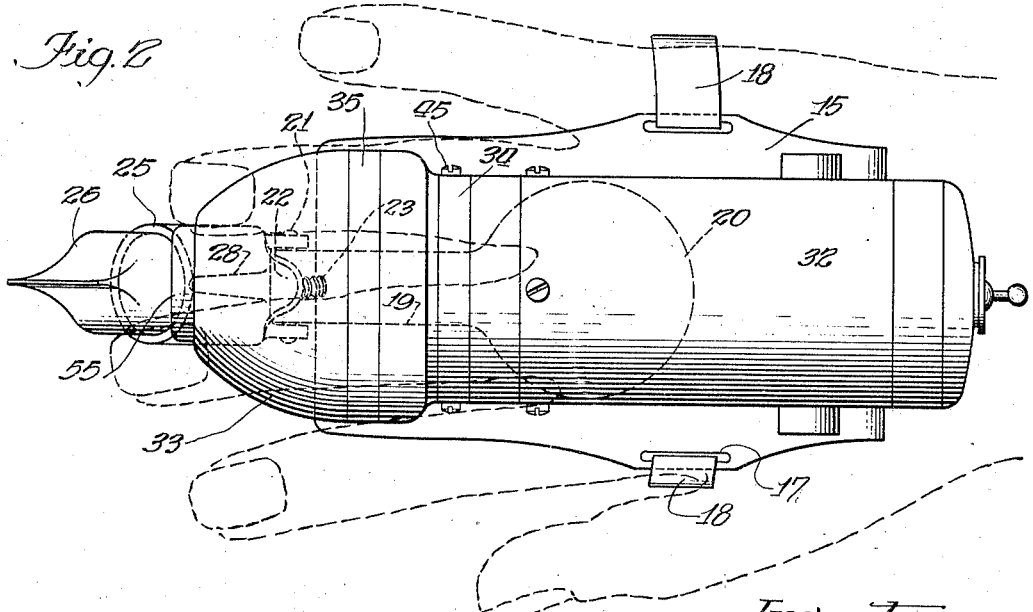

Patented Jan. 14, 1941

2,228,934

UNITED STATES PATENT OFFICE 2,228,934

MASSAGING APPLIANCE

Eli H. Tjomsland, New York, N. Y.

Application April 18, 1939, Serial No. 268,584

3 Claims. (Cl. 128—36)

My invention relates to massaging appliances, and more particularly to those manually handled or applied, and one of my objects is to provide an appliance of this kind which is comfortable and easy to handle.

A further object of the invention is to provide a simple and sanitary attaching means whereby the appliance may be supported on the hand of the operator.

A still further object of the invention is to include a vibratory unit in the appliance and so mounted as to transmit vibratory massage through the hand which supports the appliance.

Another object of the invention is to incorporate in the appliance an unit for automatically dispensing a tonic or fluid employed as a treatment during the massage.

An additional object of the invention is to include in the appliance an electrically-operated vibratory unit, which is detachable for replacement by a clipper head or other unit to which the driving source may be adapted.

Another object of the invention is to provide a manual control for varying the degree of vibration for the massage.

An important object of the invention is to design the novel appliance along lines of compactness, ruggedness and simplicity.

With the above objects in view, and any others which may suggest themselves from the description to follow, a better understanding of the invention may be had by reference to the accompanying drawings, in which—

Fig. 1 is a side elevation of the appliance, partly broken away, showing the manner in which it is mounted on the hand of the operator;

Fig. 2 is a plan view;

Fig. 3 is a view similar in part to Fig. 1, with a portion in longitudinal section;

Fig. 4 is a section on the line 4—4 of Fig. 3, showing the vibratory unit positioned for a maximum degree of vibration;

Fig. 5 is a section on the line 5—5 of Fig. 3 and similar to Fig. 4, but showing the vibratory unit positioned for a minimum of vibration;

Figs. 6 and 7 are, respectively, sections on the lines 6—6 and 7—7 of Fig. 3;

Fig. 8 is an elevation of the main portion of the vibratory unit; and

Fig. 9 is a vertical section of a pair of vibratory elements, taken on the line 9—9 of Fig. 5 and showing a change in their relative positions.

The development of massage therapy in late years has utilized mechanical or power equipment wherever possible or advantageous, and it has been my intention to adapt a power operated vibrator to the art to hand massage, so as to obtain a dual benefit.

In accordance with the foregoing, specific reference to the drawings indicates the base of the novel appliance at 15, the same being a plate of aluminum or other light metal and shaped to fit over the hand of the operator. The plate carries a rubber cushion 16 on its under side in order to be carried with comfort; and it is made with slots 17 at the sides for the attachment of a strap 18 passing loosely under the palm of the hand merely to prevent the appliance from becoming detached. In order that the plate 15 may be firmly held in place, it receives a clamp 19 from underneath, the same having a spoon-like extension 20 seating in the hollow of the hand. The clamp 19 is pivoted from the plate as indicated at 21, and has an extension 22 against which a spring 23 from the plate bears, so as to keep the clamp in the applied position, yet render the same yieldable when the hand is to be withdrawn from the appliance.

Beyond the pivot 21 the base of the appliance is built forward with a socket 25. The latter is adapted to receive a collapsible tube 26 containing a tonic or fluid intended to be used in the massaging treatment. The socket has a duct 27 leading down into a spout 28 having lateral discharge orifices 29. At one side of the duct 27 the bottom of the socket 25 has a sharp pin or barb 30 pointing upwardly. Thus, when the tube 26 is inserted, it becomes pierced by the pin 30, but not to a discharging extent. However, when the appliance is in vibration, the puncture yields a discharge sufficient to pass through the duct 27 and emerge sidewise through the orifices 29 so as to drop on the fingers or trickle therebetween to the part massaged. Other types of sealed containers, whether of metal or treated paper and capable of being punctured, may replace the tube 26.

The base 15 serves as a support for an encased electric motor 32 and a vibrator housing 33. The latter is made with a neck 34 placeable against the front of the motor 32; and the base 15 is extended with a ring bracket 35 which occupies a place between the housing 33 and its neck portion 34. Thus, as clearly shown in Fig. 3, the housing 33 is formed with a screw reduction 36; and the ring bracket 35 and the neck 34 are internally threaded to be screwed in succession upon the reduction 36, so that the housing and motor assembly thus become firmly mounted over the base 15.

While the mounting just described may be considered unitary, the motor is intended to be removable, means for this purpose being indicated in Figs. 3 and 7. Thus, the front of the motor is made with a pair of crescent shaped blocks 38, each having secured to it a similarly shaped plate 39 by means of screws 40. The alternate ends of the plates 39 are formed with curved clips 41. The housing neck 34 has an internal cavity 34a in whose walls are oppositely arranged recesses 42. Each recess contains a ball 43 backed by a spring 44, the latter being controlled by a screw 45. The recess 42 is of a nature to permit only a portion of the ball to project into the cavity 34a. Thus, when the motor is applied to the housing neck 34 with the balls 43 adjoining the rounded portions 41 of the plates 39, as shown in Fig. 3, a twist of the motor in the direction of the arrow in Fig. 7 will cause each ball to climb into the related clip 41 and hold its engagement by virtue of the spring resistance behind it, effecting the attachment of the motor to the housing neck.

When the motor 32 is removed by a reversal of its foregoing movement, the motor shaft 46 and certain parts carried by the same will recede from the vibrator housing 33. One of the parts just mentioned is a worm 47 which is tightly driven on the motor shaft 46 and formed with end slots 48 receiving the end portions of a cross pin 49 carried by the shaft, thus being locked from rotation relative to the shaft. The forward end of the worm 47 carries a clutch member 50 which will be given more detail in a later section. The worm 47 has no function in the present embodiment, but it is adaptable as a driver for a clipper head which is attachable to the motor 32 when the latter is removed from the vibrator housing. The motor can thus be used for either a vibrator or hair clipper by the simple interchange of forward units. Yet, the worm 47 is not an obstacle in the present embodiment, but may simply be considered as a continuation of the motor shaft.

In order that the vibratory unit may receive motion from the motor shaft, a tubular receptacle 52 is employed to receive the latter, the receptacle being disposed for rotation in rear and forward ball bearings 53 and 54. The bearing 53 is carried by the housing neck 34, while the bearing 54 is carried by a cup 55 in the forward end of the housing.

In order that the motor shaft 46 may become engageable with the receptacle 52, the latter receives a clutch element 56 as a mate for the element 50. The element 56 is extended forward with a stem 57 which is medially recessed in its forward end as indicated at 58. Pins 59 extend into the recess 58 from the sides of the receptacle 52 as indicated more clearly in Fig. 4; and a spring 60 extends from the front end of the receptacle into the center of the recess 58 to bear rearwardly on the clutch element 56. It is now evident that the pins 59 establish a rotary connection between the clutch element 56 and the receptacle 52; and it may now be explained that the clutch elements 50 and 56 are formed with spiral profiles, which inter-engage when the shaft 46 rotates in a given direction. Should this direction be reversed, the clutch element 50 would trip the element 56, the latter yielding by the resistance of the spring 60 without imparting motion to the receptacle 52. The actual form of the clutch just described is duplicated in another assembly about to be described and of which a clear illustration is provided.

It is intended that the rotation of the receptacle 52 put in motion a pair of weights 61 and 62 which are arranged radially of and in longitudinal succession along the receptacle. When the weights are together, as shown in Figs. 3, 4 and 8, they impose a maximum distortional influence upon the rotating receptacle, creating a corresponding degree of vibration of the housing 33; however, when the weight 62 is rotated toward a position diametrically opposite the weight 62, the vibration decreases until the weights are balanced, at which time there is little or no vibration. In an appliance of the present character, different degrees of vibration on the part of the housing 33 are desirable, according to the location of the parts treated or the intensity prescribed for the treatment. It is therefore my intention to so arrange and control the weights 61 and 62 that any desired degree of vibration may be obtained.

Accordingly, the weight 61 is formed with a hub 63 which is firmly secured on the receptacle 52 by means of a set screw 64. The weight 62 also has a hub 65, but the same is freely rotatable on the receptacle. The weights, when they are in the same direction, are together, as indicated in Figs. 3 and 8; however, when the weight 62 has been rotated to a position diametrically opposite from the weight 61, it becomes separated therefrom as clearly shown in Fig. 9. The separation is induced by a spiral clutch composed of elements 66 and 67 formed in the hub portions of the weights 61 and 62 and having contiguous profiles 66a and 67a. Therefore, the rotation of the weight 61 in a given direction will cause the profiles to function as a thread and induce the separation of the weight 62 from the weight 61.

The cup 55 is employed as a control for the separating movement just described. Thus, this cup is formed with a threaded inner end, as shown at 68 which meshes in a tapped axial cavity 69 in the forward end of the housing 33. Now, when the cup 55 is in the position indicated by full lines in Fig. 3, the ball bearing 54 carried by the cup is practically in touch with the hub 65 of the weight 62. Hence, the latter will be locked against forward movement on the rotation of the receptacle 52, and the weight 62 will thus remain in the same direction as the weight 61. However, when the cup 55 is manually rotated in a retracting direction, such as to the position indicated by dotted lines in Fig. 3, leeway will be created for the weight 62 in a forward direction by the recession of the ball bearing 54 along the forward portion of the receptacle. The leeway mentioned will permit the weight 62 to rotate to the extent predicated by its longitudinal path, so that the cup 55 becomes a handy and very flexible control for the vibrational latitude of the housing 33.

With the vibration of the housing 33 transmitted to the base 15 through the ring bracket 35, it will be understood that the hand of the operator will receive a vibratory or massaging movement of any desired frequency, and that the rate of dispensing the tonic or fluid treatment from the tube 26 will vary accordingly.

It has been explained that the housing 33 and its neck portion 34 are removable as a unit from the motor; and it will be evident from Fig. 3 that the components of the housing may also be taken apart for repair, lubrication or other attention to the parts within. Further, the clutch 50—56 provides a non-rigid drive from the motor shaft 46 to the receptacle 52, so that any lack of alignment between the receptacle and the motor shaft will not throw the latter off-center or impose a strain on its rotation. Further, the vibration control for the weights is in the form of an unit which is not in rotation, so that it may be safely handled or adjusted. Finally, the assembly consists of parts which are simple, rugged and compactly grouped so as to render the housing 33 as small as the mechanism will permit and thus prevent the appliance from being too heavy for comfort.

While I have described the novel appliance along specific lines, various minor changes and refinements may be made therein without departing from its principle, and I desire to consider all such changes and refinements as coming within the scope and spirit of the appended claims.

I claim:

1. A massage appliance comprising a base member adapted to be supported over the back of the operator's extended hand and to receive vibratory motion, a fluid receptacle carried by the support in the region over the fingers of the hand, and a dispenser for said fluid directed from the receptacle to a point in the zone of said fingers.

2. The structure of claim 1, a pointed element rising from the floor of the receptacle, and a closed fluid container inserted in the receptacle to meet the pointed element and become punctured thereby the vibration of the base member being transmitted to the container with the effect of a flow of the fluid from the punctured area.

3. The structure of claim 1, a pointed element rising from the floor of the receptacle, and a closed fluid container inserted in the receptacle to be perforated and plugged by the pointed element, the vibration of the base member being transmitted to the container with the effect of intermittently loosening it from the plugging element and causing a flow of the fluid from the perforated area.

ELI H. TJOMSLAND.